(12) United States Patent
Koyama et al.

(10) Patent No.: US 9,306,440 B2
(45) Date of Patent: Apr. 5, 2016

(54) ELECTROMAGNETIC ACTUATOR, AND ACTIVE VIBRATION DAMPER AND FLUID-FILLED ACTIVE VIBRATION DAMPING DEVICE USING THE SAME

(71) Applicant: SUMITOMO RIKO COMPANY LIMITED, Komaki-shi, Aichi (JP)

(72) Inventors: Hironori Koyama, Kasugai (JP); Masahiko Nagasawa, Kasugai (JP); Yuji Hashimoto, Iwakura (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 0 days.

(21) Appl. No.: 14/559,088

(22) Filed: Dec. 3, 2014

(65) Prior Publication Data

US 2015/0198215 A1    Jul. 16, 2015

(30) Foreign Application Priority Data

Jan. 16, 2014    (JP) ................................ 2014-005632

(51) Int. Cl.
| | |
|---|---|
| F16F 15/00 | (2006.01) |
| H02K 41/035 | (2006.01) |
| F16F 7/10 | (2006.01) |
| F16F 7/104 | (2006.01) |
| H02K 33/16 | (2006.01) |

(52) U.S. Cl.
CPC .............. *H02K 41/035* (2013.01); *F16F 7/104* (2013.01); *F16F 7/1011* (2013.01); *H02K 33/16* (2013.01)

(58) Field of Classification Search
CPC ......... F16F 15/005; F16F 13/08; F16F 13/26; H02K 41/035
See application file for complete search history.

(56) References Cited

U.S. PATENT DOCUMENTS

| | | | |
|---|---|---|---|
| 8,172,209 B2 | 5/2012 | Muraoka | |
| 2009/0079114 A1* | 3/2009 | Muraoka | F16F 13/26 267/121 |
| 2009/0079118 A1* | 3/2009 | Muraoka | F16F 13/26 267/140.14 |

FOREIGN PATENT DOCUMENTS

| | | |
|---|---|---|
| JP | A-2000-234645 | 8/2000 |
| JP | B2-4852030 | 1/2012 |

* cited by examiner

*Primary Examiner* — Vishal Sahni
(74) *Attorney, Agent, or Firm* — Oliff PLC (57) ABSTRACT

An electromagnetic actuator including: a stator; a mover attached displaceable in relation to the stator; a plurality of plate springs elastically coupling the stator and the mover; and a coil member attached to one of the stator and the mover. Each of the plate springs includes an outer circumference attachment part and a center attachment part respectively attached to one and another of the stator and the mover. A plurality of spiral-shaped connection arm parts are provided at equal intervals in a circumferential direction radially between the outer circumference attachment part and the center attachment part so as to extend in a radial direction while being inclined in the circumferential direction. The plate springs overlap in a thickness direction and all of the plate springs are mutually formed with a same material and in a same shape.

4 Claims, 3 Drawing Sheets

ELECTROMAGNETIC ACTUATOR, AND ACTIVE VIBRATION DAMPER AND FLUID-FILLED ACTIVE VIBRATION DAMPING DEVICE USING THE SAME

INCORPORATED BY REFERENCE

The disclosure of Japanese Patent Application No. 2014-005632 filed on Jan. 16, 2014 including the specification, drawings and abstract is incorporated herein by reference in its entirety.

BACKGROUND OF THE INVENTION

1. Field of the Invention

The present invention relates to an electromagnetic actuator by which a mover is driven in relation to a stator by energization to a coil, and to an active vibration damper and a fluid-filled active vibration damping device using the same.

2. Description of the Related Art

From the past, an electromagnetic actuator has been known as one type of vibration damping actuator used for actively controlling the vibration damping characteristics of a vibration damping device by applying active oscillation force to a member subject to vibration damping. With the electromagnetic actuator, the mover is attached so as to be displaceable relative to the stator, and by energization to a coil member attached on one of either the stator or the mover, the mover is driven in relation to the stator.

However, as shown in Japanese Patent No. JP-B-4852030, with the electromagnetic actuator, the stator and the mover are linked to each other by a plate spring, and by elastic deformation of the plate spring in the thickness direction, displacement of the mover in relation to the stator is allowed, and the mover and stator are aligned to each other in the radial direction of the plate spring.

Also, with JP-B-4852030, so that sufficient displacement is allowed of the mover in the thickness direction of the plate spring, a plurality of lightening holes are formed on the plate spring, and the plate spring has a constitution with which a center attachment part attached to the mover and an outer circumference attachment part attached to the stator are integrally linked to each other by a plurality of connection arm parts. This connection arm part extends in the radial direction while being inclined in the circumferential direction, with one end being integrally connected to the center attachment part, and the other end being integrally connected to the outer circumference attachment part.

Furthermore, with the electromagnetic actuator, as with JP-B-4852030, there are cases when a plurality of plate springs are used overlapping. In this case, the plate spring material, thickness dimension and the like can be set individually according to the required spring characteristics or the like, so with a plurality of plate springs, there are cases when these will be different from each other.

However, when palate springs with different materials, thickness dimensions and the like are used overlapping, due to differences in deformation volume in relation to ambient temperature changes, there can be mutual differences in the shape of the plate springs with a thickness direction view (particularly the shape of the connection arm part), and by local stress concentration occurring at the connection arm part, there is the risk of a decrease in durability of the plate springs.

SUMMARY OF THE INVENTION

The present invention was created with the circumstances described above as the background, and the problem it is to address is to provide an electromagnetic actuator of a novel structure for which it is possible to set the spring constant of the plate springs to be large, and to increase the durability of the plate springs, as well as an active vibration damper and a fluid-filled active vibration damping device using the same.

Following, we will describe modes of the present invention created for addressing this kind of problem. The constitutional elements used with each mode noted hereafter can be used in as many combinations as are possible.

Specifically, a first mode of the present invention provides an electromagnetic actuator including: a stator; a mover attached displaceable in relation to the stator; a plurality of plate springs elastically coupling the stator and the mover; and a coil member attached to one of the stator and the mover, the coil member being energized to generate a magnetic field that exerts a force on the mover to drive the mover in relation to the stator, wherein each of the plate springs includes an outer circumference attachment part and a center attachment part respectively attached to one and another of the stator and the mover, a plurality of spiral-shaped connection arm parts are provided at equal intervals in a circumferential direction between the outer circumference attachment part and the center attachment part in a radial direction so as to extend in the radial direction while being inclined in the circumferential direction, and the plate springs overlap in a thickness direction and all of the plate springs are mutually formed with a same material and in a same shape.

With this kind of electromagnetic actuator constituted according to the first mode, a plurality of the plate springs that link the stator and the mover overlap in the thickness direction, so it is possible to set the spring constant in the thickness direction to be large without making the thickness of each plate spring large. Therefore, when the mover undergoes drive displacement in relation to the stator, while the spring constant in the thickness direction is set to be large for the overall plate spring, it is possible to prevent the distortion of each plate spring from becoming markedly large.

Furthermore, since the plurality of plate springs are mutually formed with the same material and in the same shape, when the plate spring has swelling deformation or contraction deformation due to temperature changes, the deformation volume of those plate springs are equal to each other. Therefore, having stress and thus distortion concentrate on a specific plate spring due to a difference in deformation volume is prevented, and durability is improved.

On the plate springs for which the outer circumference attachment part and the enter attachment part are attached one each to the stator and the mover, stress is mainly applied by swelling deformation or contraction deformation in the length direction of the connection arm part, but by the plurality of plate springs being mutually formed with the same material and in the same shape, the linear expansion coefficient of those plate springs are mutually the same. In addition to that, by having the thickness dimension of the plurality of plate springs be mutually the same, the heat capacity of those plate springs is also mutually the same, and since the plurality of plate springs are heated or cooled in roughly the same manner in relation to changes in external temperature or the like, the deformation volume of those plate springs is more precisely kept roughly the same.

Also, by constituting a plurality of plate springs with a single part, it is possible to reduce the number of types of parts, and to improve manufacturing efficiency.

A second mode of the present invention provides the electromagnetic actuator according to the first mode, wherein the plate springs are matched to mutually a same position in the circumferential direction.

With the second mode, when the mover is driven and displaced in relation to the stator, and the plurality of plate springs are elastically deformed in the thickness direction, the deformation volume and deformation mode of each part of those plate springs are mutually the same, and the occurrence of noise due to interference between plate springs or stress concentration due to deformation differences or the like are avoided. In fact, even when the connection arm parts of the plurality of plate springs are deformed due to temperature changes, the connection arm parts of those plate springs maintain the same shape and the same orientation in the circumference direction, so noise due to interference between plate springs and stress concentration are avoided in relation to elastic deformation in the thickness direction of the plate springs due to driving of the mover.

A third mode of the present invention provides the electromagnetic actuator according to the first or second mode, wherein an outer circumference spacer is interposed between overlapping surfaces of the outer circumference attachment parts of the plate springs, a center spacer is interposed between overlapping surfaces of the center attachment parts of the plate springs, and the connection arm parts of the plate springs are separated from each other in the thickness direction.

With the third mode, when the mover is driven and displaced relative to the stator, and the connection arm part of the plate spring is elastically deformed in the thickness direction, it is possible to prevent the connection arm parts of the plurality of plate springs from rubbing against each other, and to prevent the occurrence of noise. In particular, by interposing spacers respectively between overlapping surfaces of the outer circumference attachment parts and the center attachment parts with the connection arm parts separated, it is possible to prevent the occurrence of noise while ensuring the free length of the connection arm parts and realizing the required spring characteristics and durability. The outer circumference parts and the center attachment parts sandwiching the spacers are attached one each to the stator and the mover, so there is not a problem of rubbing or the like of the spacers, the outer circumference attachment parts, and the center attachment parts.

A fourth mode of the present invention provides an active vibration damper including an actuator that is attached to a member subject to vibration damping and applies an oscillation force thereto, wherein the actuator is composed of an electromagnetic actuator according to any one of the first through third modes, and the stator of the electromagnetic actuator is attached to the member subject to vibration damping, and the mover is elastically supported on the member subject to vibration damping via the plate springs.

With this kind of active vibration damper of a constitution according to the fourth mode, by using the electromagnetic actuator of the present invention, even if the plurality of plate springs linking the mover and stator are repeatedly deformed due to oscillation, the distortion of those plate springs is reduced, so durability is advantageously ensured, and high reliability is realized.

A fifth mode of the present invention provides a fluid-filled active vibration damping device including: a first mounting member; a second mounting member; a main rubber elastic body elastically coupling the first and second mounting members; a pressure-receiving chamber a portion of whose wall is constituted by the main rubber elastic body and in which a non-compressible fluid is sealed, while another portion of the wall of the pressure-receiving chamber being constituted by an oscillation member; and an actuator that does oscillation driving of the oscillation member, wherein the actuator is composed of an electromagnetic actuator according to any one of the first through third modes, and the stator of the electromagnetic actuator is attached to the second mounting member, and the mover is attached to the oscillation member.

With this kind of active vibration damping device constituted according to the fifth mode, by using the electromagnetic actuator of the present invention as the actuator that does oscillation driving of the oscillation member, even if the plurality of plate springs that link the mover and the stator are repeatedly deformed due to oscillation, the distortion of those plate springs is reduced, so durability is advantageously ensured, and high reliability is realized.

With the present invention, since a plurality of plate springs overlap in the thickness direction, it is possible to set the spring constant in the thickness direction to be large without markedly increasing the thickness of each plate spring, and a high degree of freedom for the required spring characteristics is realized while suppressing distortion of the plate springs in relation to deformation in the thickness direction. Furthermore, by the plurality of plate springs being mutually formed with the same material and in the same shape, the deformation volume of those plate springs in relation to temperature changes is roughly mutually the same, so stress concentration on a specific plate spring due to differences in deformation volume is avoided, and durability is improved.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Following we will describe an embodiment of the present invention while referring to the drawings.

Figure 1:
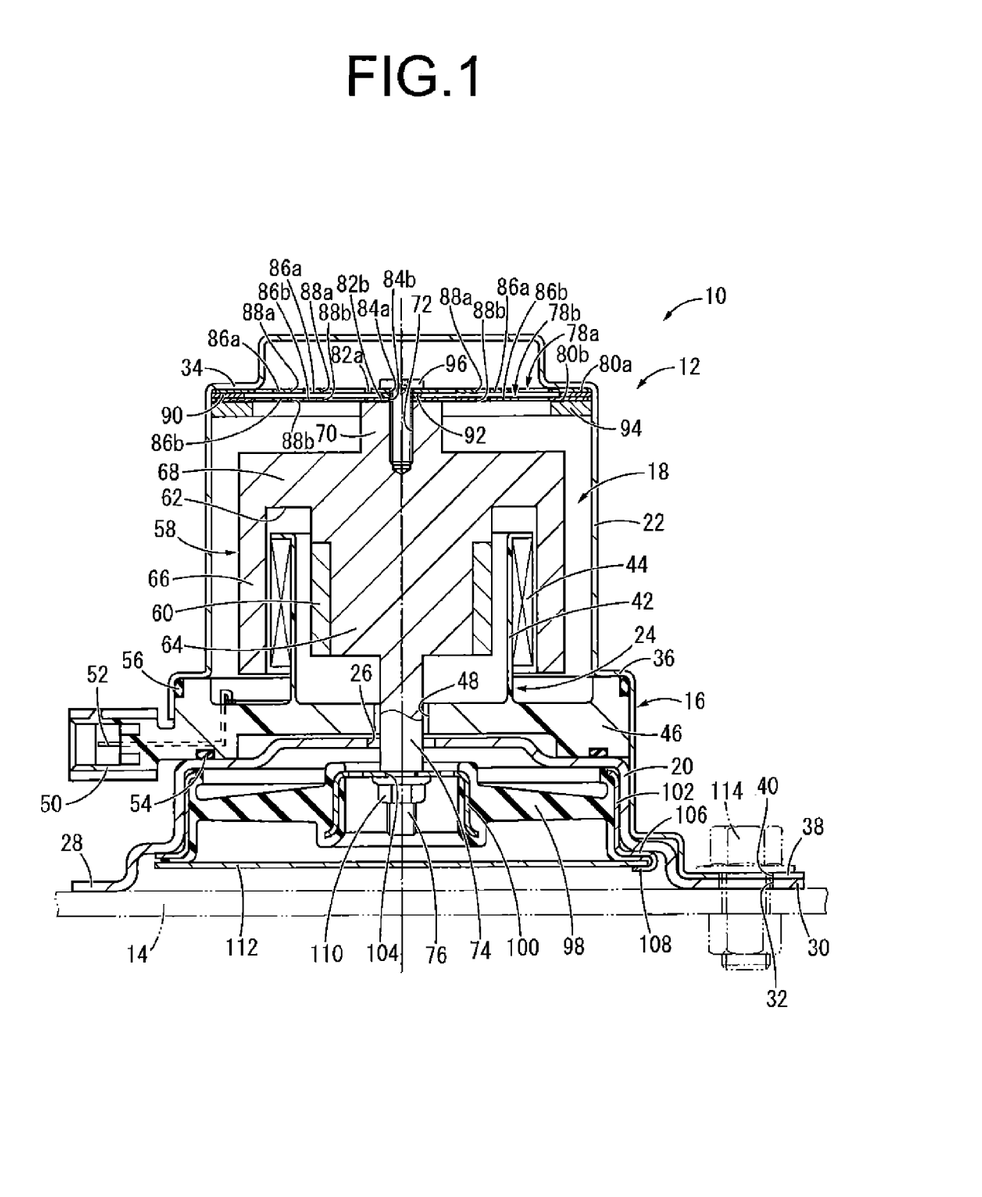
FIG. 1 is an elevational view in axial or vertical cross section of an active vibration damper according to a first embodiment of the present invention, which correlates to cross section taken along line 1-1 of FIG. 2.
Figure 2:
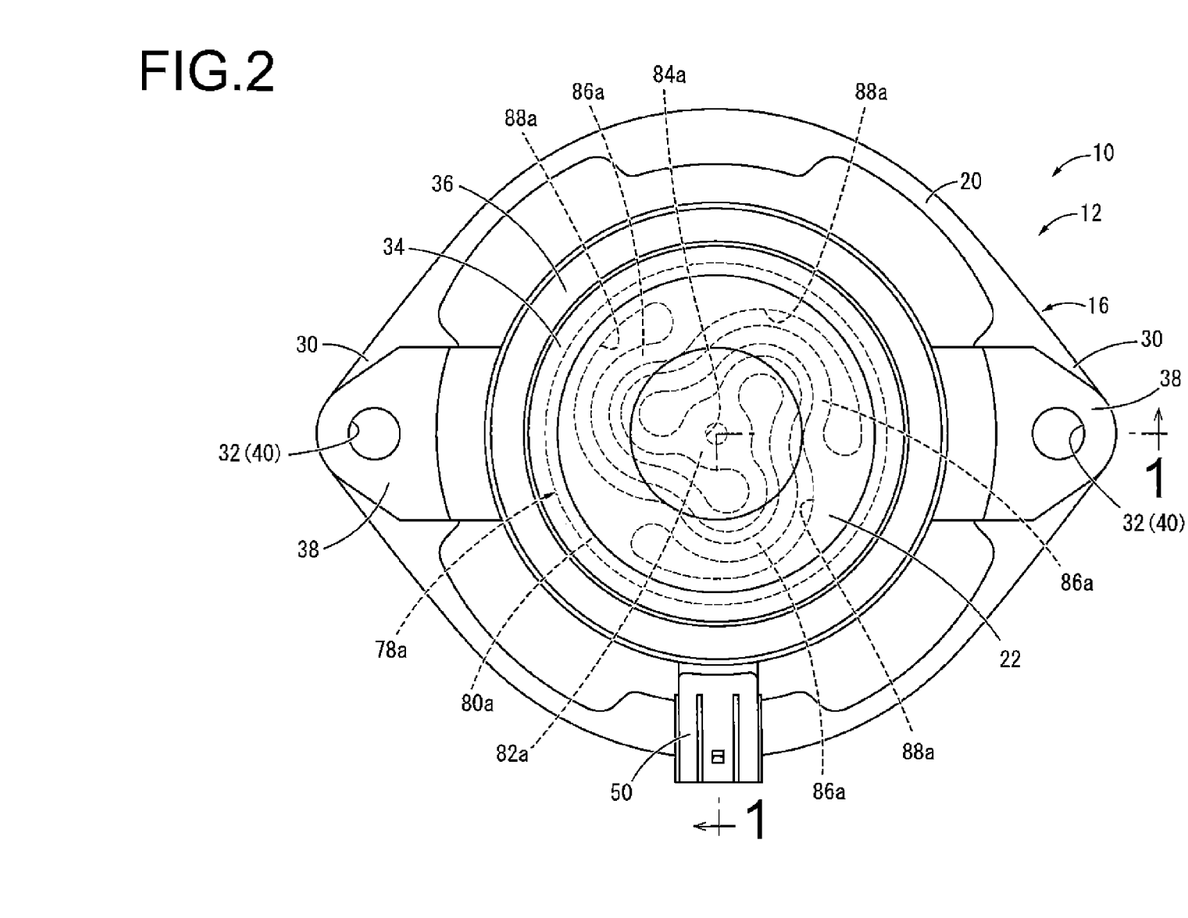
FIG. 2 is a plan view of the active vibration damper shown in FIG. 1.

FIGS. 1 and 2 show an active vibration damper 10 as a first embodiment of the present invention. This active vibration damper 10 is equipped with an electromagnetic actuator 12 as an actuator, and by oscillation force of the electromagnetic actuator 12 being applied to a vehicle body 14 as a member subject to vibration damping, the vibration is decreased by offset. With the description below, the vertical direction means the vehicle vertical direction in a vehicle mounted state, and means the vertical direction in FIG. 1 which is the oscillation direction of the electromagnetic actuator 12, and the front-back direction means the vertical direction in FIG. 2 which is the vehicle front-back direction in the vehicle mounted state.

In more detail, the electromagnetic actuator 12 is equipped with a stator 16 and a mover 18. The stator 16 has a constitution with a cover member 22 and a coil member 24 attached to a base member 20 fixed on the vehicle body 14.

The base member 20 has a roughly cylindrical shape with a bottom facing the reverse, and a lower through hole 26 that pierces vertically is formed on the center part of the upper base wall part. Furthermore, on a lower opening edge part of the base member 20, a flange part 28 that expands to the outer circumference side is formed across the entire circumference, and a pair of base attachment pieces 30, 30 that are larger and project to the outer circumference side are formed in the lateral radial direction. Bolt holes 32 are respectively formed piercing vertically on the pair of base attachment pieces 30, 30.

The cover member 22 has a roughly cylindrical shape with a bottom reverse facing the depth bottom, an upper base step part 34 is formed near the upper base wall part, an opening step part 36 is provided on the opening part, and the diameter becomes larger in steps facing downward which is the opening side. Also, the cover member 22 is equipped with a pair of cover attachment pieces 38, 38 laterally in the radial direction on the opening edge part that has a large diameter. The pair of cover attachment pieces 38, 38 have a plate shape extending out downward and for which the lower edge part is curved and extends laterally to the outside, and bolt holes 40 are formed piercing vertically on the lower edge part extending laterally outward.

Then, the cover member 22 has the pair of cover attachment pieces 38, 38 overlapping in the radial direction on the outer circumference surface of the base member 20, and overlapping vertically on the pair of base attachment pieces 30, 30, and aligned to each other. The bolt holes 32, 32 of the pair of base attachment pieces 30, 30 and the bolt holes 40, 40 of the pair of cover attachment pieces 38, 38 are aligned to each other.

Also, the coil member 24 is arranged between the base member 20 and the cover member 22. The coil member 24 has a constitution for which a coil 44 is wound onto a bobbin 42. The bobbin 42 is a hard member formed using a nonmagnetic material such as synthetic resin or the like, and overall has a roughly cylindrical shape with a bottom, and has coil 44 wound on it. Furthermore, a bottom wall part 46 of the bobbin 42 which has a thick wall is equipped with an upper through hole 48 piercing vertically at the radial direction center part, and projects in the radial direction outward across the entire circumference, and a power feed connector 50 is integrally formed on a part of the circumference. The power feed connector 50 projects facing backward from the bottom wall part 46 of the bobbin 42, and has an overturned roughly cylindrical shape with a bottom opening toward the rear, and one end of a connector metal fitting 52 embedded in the bottom wall part 46 of the bobbin 42 projects to the inner circumference side of the power feed connector 50. The other end of the connector metal fitting 52 is connected to the coil 44.

Then, with the coil member 24, the outer circumference end part of the bottom wall part 46 is sandwiched vertically between the upper base wall part of the base member 20 and the opening step part 36 of the cover member 22, and is installed between the base member 20 and the cover member 22. Also, the power feed connector 50 of the coil member 24 projects facing backward from between the base member 20 and the cover member 22. Between the overlapping surfaces of the bottom wall part 46 of the bobbin 42 and the base member 20 and the cover member 22 are respectively sealed using ring shaped sealing rubbers 54 and 56, and penetration of foreign matter such as dust, water or the like is prevented.

The mover 18 is attached to the stator 16 constituted in this way. The mover 18 has a constitution with which a permanent magnet 60 is fixed to a yoke metal fitting 58. The yoke metal fitting 58 is formed with a ferromagnetic material such as iron or the like, and overall has a thick walled round block shape, and at the radial direction middle part, a circumferential groove 62 that opens at the bottom surface is formed extending in a circumferential direction ring shape. By doing this, on the yoke metal fitting 58, a center column part 64 with a roughly round column shape is formed on the inner circumference side of the circumferential groove 62, and a roughly cylindrical shaped outer circumference tube part 66 is formed on the outer circumference side of the circumferential groove 62, and at the top end, the center column part 64 and the outer circumference tube part 66 are integrally linked by a roughly disk shaped middle plate part 68.

Furthermore, at the radial direction center part of the yoke metal fitting 58, a coupling projection 70 projecting upward with a small diameter roughly round column shape is integrally formed, and a screw hole 72 opened at the top surface extending on the center axis is formed on the coupling projection 70. Furthermore, at the radial direction center part of the yoke metal fitting 58, a rod part 74 projecting downward is integrally formed, and on the rod part 74, a screw part 76 projecting downward is integrally formed.

The permanent magnet 60 has a roughly cylindrical shape, is magnetized in the radial direction, and has mutually different magnetic poles formed on the inner circumference surface and the outer circumference surface. Also, the permanent magnet 60 is externally fitted and fixed on the center column part 64 of the yoke metal fitting 58, and has mutually different magnetic poles formed on the inner circumference surface and the outer circumference surface of the circumferential groove 62 so as to form a magnetic field inside the circumferential groove 62. A part of the inner circumference surface of the circumferential groove 62 is constituted by the outer circumference surface of the permanent magnet 60.

Also, with the mover 18, the yoke metal fitting 58 and the permanent magnet 60 are installed between the cover member 22 and the coil member 24, and it is housed in the stator 16. Also, the rod part 74 that extends out downward from the center column part 64 of the yoke metal fitting 58 is inserted through the upper through hole 48 of the bobbin 42 and the lower through hole 26 of the base member 20, and projects to the inner circumference of the base member 20.

Furthermore, the coil 44 of the coil member 24 is inserted into the circumferential groove 62 of the yoke metal fitting 58, and installed in the radial direction between the yoke metal fitting 58 outer circumference tube part 66 and the permanent magnet 60, and the coil 44 is positioned in the magnetic field formed by the permanent magnet 60 and the yoke metal fitting 58. The coil 44 and the tube part of the bobbin 42 on which the coil 44 is wound are arranged separated from both the permanent magnet 60 and the yoke metal fitting 58.

Figure 3:
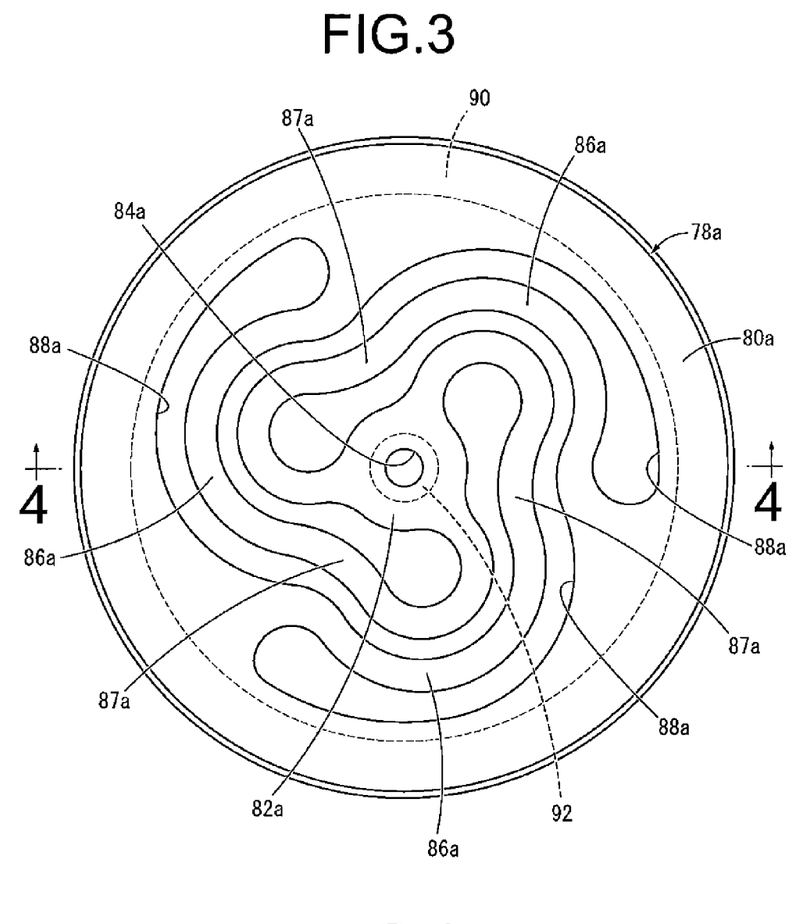
FIG. 3 is an enlarged plan view of a plate spring constituting the active vibration damper shown in FIG. 1.
Figure 4:
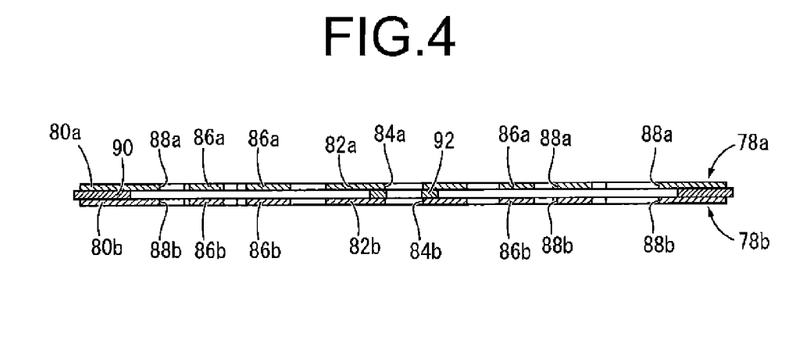
FIG. 4 is a cross sectional view taken along line 4-4 of FIG. 3.

Also, the cover member 22 of the stator 16 and the yoke metal fitting 58 of the mover 18 are elastically coupled to each other by a plate spring 78a and a plate spring 78b. As shown in FIGS. 3 and 4, the plate spring 78a/78b is a thin walled roughly round plate shaped member formed of spring steel or the like, and its outer circumference end part is equipped with a roughly round ring shaped outer circumference attachment part 80a/80b, while its radial direction center is equipped with a roughly round plate shaped center attachment part 82a/82b. A screw hole 84a/84b that pierces in the thickness direction is formed on the center attachment part 82a/82b.

Furthermore, three spiral-shaped connection arm parts 86a/86b, 86a/86b, 86a/86b are formed radially between the outer circumference attachment part 80a/80b and the center attachment part 82a/82b of the plate spring 78a/78b. The three connection arm parts 86a/86b, 86a/86b, 86a/86b each extend in the radial direction while being inclined in the circumferential direction, they have roughly the same shape to each other, and are arranged at equal intervals on the circumference. More specifically, the connection arm part 86a/86b has a middle curved part 87a/87b curved so as to be concave opening towards the outer circumference and extending in roughly the circumferential direction, and both side parts of the middle curved part 87a/87b curve so as to be convex facing the outer circumference, and extend in roughly the circumferential direction. In this way, the incline angles of the connection arm parts 86a/86b differ in the length direction, and by the connection arm parts 86a/86b being wavy, an increase in the effective free length accompanied by dispersion of the stress and distortion is achieved.

Also, the three connection arm parts 86a/86b, 86a/86b, 86a/86b have one end connected to the outer circumference attachment part 80a/80b, and the other end connected to the center attachment part 82a/82b, and the outer circumference attachment part 80a/80b and the center attachment part 82a/82b are integrally linked to each other by the three connection arm parts 86a/86b, 86a/86b, 86a/86b. Also, the respective ends of the connection arm part 86a/86b linked to the outer circumference attachment part 80a/80b and the center attachment part 82a/82b are arranged at mutually different positions in the circumferential direction, and the extending direction from the outer circumference attachment part 80a/80b and the extending direction from the center attachment part 82a/82b are mutually different. Skew of both ends of the connection arm part 86a/86b is preferably ⅙ of a circumference or greater in the circumferential direction, and more preferably ¼ circumference or greater and ⅘ of a circumference or less.

Furthermore, between the three connection arm parts 86a/86b, 86a/86b, 86a/86b on the plate spring 78a/78b, slits 88a/88b are respectively formed. The slits 88a/88b pierce through the plate spring 78a/78b in the thickness direction, and extend in the radial direction while being inclined in the circumferential direction.

Here, the plate spring 78a and the plate spring 78b are mutually formed with the same material and in the same shape, and as shown in FIG. 4, they overlap in the thickness direction. By doing this, the plate spring 78a and the plate spring 78b have mutually equal linear expansion coefficients in the radial direction, and the heat capacities are also equal to each other. Having the shapes of the plate spring 78a and the plate spring 78b be mutually the same means the dimension of each part are mutually the same, but does not include similar shapes of different sizes.

Also, the plate spring 78a and the plate spring 78b are matched to mutually the same position in the circumferential direction. By doing this, the plate spring 78a connection arm part 86a and the plate spring 78b connection arm part 86b are arranged at mutually corresponding positions, and the slit 88a of the plate spring 78a and the slit 88b of the plate spring 78b are arranged at mutually corresponding positions, and the edge parts of the plate springs 78a and 78b roughly overlap overall.

Furthermore, an outer circumference spacer 90 is interposed between the overlapping surfaces of the plate spring 78a and the plate spring 78b. The outer circumference spacer 90 has a large diameter roughly round ring plate shape, is sandwiched between the plate spring 78a outer circumference attachment part 80a and the plate spring 78b outer circumference attachment part 80b, and is arranged between the outer circumference end parts of the plate springs 78a and 78b.

Furthermore, a center spacer 92 is interposed between the overlapping surfaces of the plate spring 78a and the plate spring 78b. The center spacer 92 has a small diameter roughly round ring plate shape, is sandwiched between the plate spring 78a center attachment part 82a and the plate spring 78b center attachment part 82b, and is arranged so as to enclose the opening circumference edge of screw holes 84a and 84b of the plate springs 78a and 78b. The outer circumference spacer 90 and the center spacer 92 are roughly the same to each other in the thickness dimension.

In this way, the outer circumference spacer 90 and the center spacer 92 are arranged between the overlapping surfaces of the plate spring 78a and the plate spring 78b, and the radial direction middle part of the plate spring 78a and the radial direction middle part of the plate spring 78b are separated by a designated distance to each other in the thickness direction, and are arranged facing each other. In other words, the connection arm part 86a of the plate spring 78a and the connection arm part 86b of the plate spring 78b are arranged facing each other separated in the thickness direction.

Also, as shown in FIG. 1, the outer circumference attachment parts 80a and 80b of the plate springs 78a and the plate spring 78b as well as the outer circumference spacer 90 are sandwiched vertically between the upper base step part 34 of the cover member 22 and a ring member 94 fit into the cover member 22, and the center attachment parts 82a and 82b of the plate springs 78a and 78b as well as the center spacer 92 are overlapped on the coupling projection 70 of the yoke metal fitting 58, and are fixed to the yoke metal fitting 58 by a screw 96 screwed into screw hole 72 of the coupling projection 70. With these, the outer circumference parts of the plate springs 78a and 78b are attached to the stator 16, and the center parts of the plate springs 78a and 78b are attached to the mover 18, and the stator 16 and the mover 18 are mutually linked by the plate springs 78a and 78b. As a result, the mover 18 is relatively positioned in the radial direction by the plate springs 78a and 78b in relation to the stator 16, and by the elastic deformation in the thickness direction of the plate springs 78a and 78b, is displaceable vertically in the axis direction relative to the stator 16.

With the electromagnetic actuator 12 constituted as described above, the power feed connector 50 is connected to an external power supply (not illustrated), and by power being fed to the coil 44, current flows in the magnetic field formed by the permanent magnet 60 and the yoke metal fitting 58, and oscillation drive force is applied based on the electromagnetic force between the stator 16 and the mover 18. Also, by the generated oscillation drive force, the mover 18 is driven and displaced vertically in relation to the stator 16.

Also, the mover 18 and the stator 16 of the electromagnetic actuator 12 are elastically coupled by a support rubber elastic body 98. The support rubber elastic body 98 is a rubber elastic body having a roughly round ring plate shape, with the inner circumference edge part vulcanized and adhered to an inner circumference fixing member 100, and the outer circumference end part vulcanized and adhered to an outer circumference fixing member 102. The inner circumference fixing member 100 is a hard member having a roughly round cylinder shape with a bottom facing the reverse with a small diameter, and a screw hole 104 is formed in the radial direction center part of the upper base wall part. The outer circumference fixing member 102 is a hard member having a large diameter roughly round cylinder shape, with a ring shaped abutting piece 106 projecting to the outer circumference integrally formed on the lower edge, and a crimping piece 108 extending out further downward from the ring shaped abutting piece 106 integrally formed in part on the circumference. Also, the inner circumference end part of the support rubber elastic body 98 is vulcanized and adhered to the entire surface of the circumference wall part of the inner circumference fixing member 100, and the outer circumference end part of the support rubber elastic body 98 is vulcanized and adhered to the inner circumference surface of the outer circumference fixing member 102. The support rubber elastic body 98 of this embodiment is formed as an integrally vulcanization molded component equipped with the inner circumference fixing member 100 and the outer circumference fixing member 102.

Also, the screw part 76 of the yoke metal fitting 58 is inserted through the screw hole 104 of the inner circumference fixing member 100, and by screwing it in a nut 110 arranged below the screw hole 104, the inner circumference end part of the support rubber elastic body 98 is fixed to the mover 18. Furthermore, by the outer circumference fixing member 102 being fit to the circumference wall part of the base member 20, the outer circumference end part of the support rubber elastic body 98 is attached to the stator 16. By doing this, the stator 16 and the mover 18 are elastically coupled to each other by the plate springs 78a and 78b at the top part, and are elastically coupled to each other by the support rubber elastic body 98 at the bottom part.

Also, a lid member 112 is installed beneath the support rubber elastic body 98. The lid member 112 has a thin walled, large diameter roughly round plate shape, and by having the outer circumference end part crimped by the crimping piece 108 at a plurality of locations on the circumference, it is fixed to the outer circumference fixing member 102. The outer circumference end part of the support rubber elastic body 98 adhered to the lower surface of the ring shaped abutting piece 106 is interposed between the outer circumference fixing member 102 ring shaped abutting piece 106 and the lid member 112, and between the overlapping surfaces of the ring shaped abutting piece 106 and the lid member 112 is sealed, so penetration of foreign matter is prevented.

With the active vibration damper 10 with this kind of constitution, the stator 16 is directly fixed to the vehicle body 14, and the mover 18 is indirectly elastically supported on the vehicle body 14 via the plate springs 78a and 78b and the support rubber elastic body 98, thus being mounted on the vehicle. Specifically, as shown in FIG. 1, attachment bolts 114 are inserted through each bolt hole 32 and 40 of the base member 20 and the cover member 22 constituting the stator 16, and by the attachment bolts 114 being screwed into the vehicle body 14 side, the stator 16 is fixed to the vehicle body 14. Meanwhile, the mover 18 is elastically coupled to the stator 16 by the plate springs 78a and 78b and the support rubber elastic body 98, so it is supported on the vehicle body 14 via the stator 16.

Also, the stator 16 is able to specify the orientation of the circumferential direction from outside using the projection direction of the base attachment pieces 30, 30 with the base member 20 and the cover attachment pieces 38, 38 with the cover member 22, and the projection direction of the power feed connector 50 with the coil member 24. By doing this, the orientation of the stator 16 to the vehicle body 14 with the circumferential direction can be easily confirmed from outside by a visual check or the like, and the stator 16 can be attached in a suitable orientation to the vehicle body 14.

Furthermore, with the plate springs 78a and 78b, the orientation in the circumferential direction in relation to the stator 16 is set in advance to a specific orientation, and relative rotation of the circumferential direction in relation to the stator 16 is prevented. By doing this, even if the plate springs 78a and 78b covered by the cover member 22 are not viewed directly, it is possible to confirm from the outside the orientation of the plate springs 78a and 78b using the orientation of the stator 16. Therefore, as shown in FIG. 2, by attaching the stator 16 to the vehicle body 14 in a suitable orientation, it is possible to suitably set the orientation of the plate springs 78a and 78b in the circumferential direction in relation to the vehicle body 14. As is clear from the above, with this embodiment, the direction recognition means is constituted by fixing the outer circumference attachment parts 80a and 80b of the plate springs 78a and 78b being fixed between the upper base step part 34 and the ring member 94, and by the projection direction of the attachment pieces 30 and 38 and the power feed connector 50 with the stator 16.

The orientation of the plate springs 78a and 78b of this embodiment to the vehicle body 14 in the circumference direction is set using the direction recognition means so that both ends of each of the three connection arm parts 86a/86b, 86a/86b, 86a/86b which are the connecting parts to the outer circumference attachment parts 80a and 80b and the center attachment parts 82a and 82b are separated with the front-back direction of the vehicle as the circumferential direction.

Specifically, with this embodiment, with the load acting in the radial direction of the plate springs 78a and 78b, the load of the front-back direction due to vehicle acceleration, deceleration or the like has the highest input frequency and becomes the largest. In light of that, in relation to the vehicle front-back direction which is the main load input direction and also the maximum load input direction, the orientation of the plate springs 78a and 78b is set so that both ends of the connection arm part 86a/86b are separated in the circumferential direction. By setting the orientation in the circumferential direction of the plate springs 78a and 78b as described above, high frequency input of large loads in the radial direction is avoided at connection sites of both ends of the connection arm parts 86a/86b and the outer circumference attachment parts 80a and 80b and the center attachment parts 82a and 82b, and durability is improved by dispersing the stress. The plate springs 78a and 78b are aligned in the circumferential direction in relation to the stator 16, so by the stator 16 being attached to the vehicle body 14, the plate springs 78a and 78b are arranged so as to be in a designated orientation in the circumferential direction.

More preferably, the orientation in the circumferential direction of the plate springs 78a and 78b is set so that the area of 1/10 of the full length from both ends of the connection arm parts 86a and 86b is separated with the vehicle front-back direction as the circumferential direction. By doing this, dispersion of the stress is realized even more advantageously by the deformation and displacement of the middle part of the connection arm parts 86a and 86b.

Also, with the plate spring 78a/78b of this embodiment, both ends of each single connection arm part 86a/86b are arranged at mutually different positions in the circumferential direction. Therefore, when a load is input in the radial direction, due to elastic deformation of the middle part of the connection arm part 86a/86b, the stress and thus distortion transmitted to both end parts of the connection arm part 86a/86b is reduced by dispersion or the like to the middle part, and the stress that acts on both end parts of the connection arm part 86a/86b is more advantageously reduced, so durability is further improved.

Also, in the mounted state on the vehicle, the coil 44 is energized from an external power supply (not illustrated), and by the mover 18 doing oscillation driving on the stator 16, oscillation force is applied to the vehicle body 14, and vibration is offset by the oscillation force and thus reduced. Here, the stator 16 and the mover 18 are linked to each other by two plate springs 78a and 78b overlapping with each other. Therefore, compared to when linking with one plate spring, it is possible to set the spring constant in the thickness direction to be large without making the thickness dimensions of each plate spring 78a/78b larger.

Furthermore, by spacers 90 and 92 being interposed between the plate spring 78a and the plate spring 78b, when the mover 18 undergoes oscillation driving, it is possible to prevent the plate spring 78a and the plate spring 78b from rubbing each other by elastic deformation, and the occurrence of noise, damage to the plate springs 78a and 78b and the like are avoided. In fact, the outer circumference spacer 90 is installed between the outer circumference attachment parts 80a and 80b of the plate springs 78a and 78b, and the center spacer 92 is installed between the center attachment parts 82a and 82b of the plate springs 78a and 78b, so a large free length of the connection arm part 86a/86b is ensured, and durability of the plate springs 78a and 78b is ensured.

Also, the plate spring 78a and the plate spring 78b are mutually formed with the same material and in the same shape, and they are aligned so as to have the same orientation as each other in the circumferential direction, and the radial direction swelling deformation volume and contraction deformation volume due to heating or cooling are both equal to each other. Therefore, even after deformation due to temperature changes, the connection arm part 86a of the plate spring 78a and the connection arm part 86b of the plate spring 78b have roughly the same shape as each other, and during oscillation driving of the mover 18, the elastic deformation in the thickness direction of the connection arm part 86a and the connection arm part 86b occurs in mutually the same manner. Therefore, the elastic deformation of the connection arm parts 86a and 86b is allowed smoothly without them interfering with each other, and local stress concentration is prevented, so durability is improved.

In fact, since the plate spring 78a and the plate spring 78b are formed with the same material and shape as each other, in addition to the linear expansion coefficients being equal to each other, the heat capacities are also equal to each other. Therefore, in relation to ambient temperature changes, the plate spring 78a and the plate spring 78b have roughly the same temperature changes occur, and the deformation volumes of the plate spring 78a and the plate spring 78b in relation to the ambient temperature changes are roughly the same to each other, and improved durability is more advantageously obtained by dispersion of the stress.

In addition, since the plate springs 78a and 78b have the same material and the same shape, it is possible to have the plate springs 78a and 78b be a common part, and by reducing the number of types of parts, manufacturing is easier.

Also, the plate spring 78a and the plate spring 78b are aligned so as to have the same orientation in the circumferential direction. Therefore, when the mover 18 undergoes oscillation driving in relation to the stator 16, when the plate springs 78a and 78b are elastically deformed in the thickness direction, the deformation volume and deformation mode of the plate springs 78a and 78b are roughly the same. In specific terms, when the plate spring 78a and 78b outer circumference attachment parts 80a and 80b and the center attachment parts 82a and 82b are relatively displaced in the thickness direction, the connection arm parts 86a and 86b that connect the outer circumference attachment parts 80a and 80b and the center attachment parts 82a and 82b are deformed so as to be inclined in the radial direction in the vertical cross section shown in FIG. 4. Here, by the plate springs 78a and 78b being aligned in the circumferential direction, the incline angle of each site of the connection arm part 86a and the incline angle of each site of the connection arm part 86b are the same as each other, so the spring in the vertical direction is kept mutually the same, and it is possible to prevent a concentration of stress and thus distortion for both the connection arm parts 86a and 86b.

Also, by the durability of the plate springs 78a and 78b improving, excellent reliability is realized with the electromagnetic actuator 12 and the active vibration damper 10 using the same.

Above, we gave a detailed description of an embodiment of the present invention, but the present invention is not limited by that specific description. For example, the specific number and shape of the connection arm part with the plate spring are not to be interpreted as being limited by the embodiment noted above.

It is also possible to use three or more plate springs overlapped. Furthermore, the plurality of plate springs overlapped can be respectively arranged at positions separated vertically, and the mover and the stator can be linked to each other at both sides top and bottom by two sets of those plate springs.

Also, for example, it is possible to form notches or holes on the plate spring and also form projections on the stator, and by the projections locking with the plate spring notches or holes in the circumferential direction, the plate spring can be aligned to the stator in the circumferential direction. By doing this, it is possible to prevent skewing of the orientation of the plate spring 78a and the plate spring 78b in the circumferential direction, and to effectively obtain the target durability.

It is also possible to link the mover and stator by the plate springs having the outer circumference attachment parts attached to the mover, and the center attachment parts attached to the stator.

Also, with this embodiment, the outer circumference spacer 90 and the center spacer 92 both have a continuous ring shape in the circumferential direction, but for example it is also possible for spacers extending with a length less than a half cycle in the circumferential direction to be provided partially on a plurality of locations on the circumference.

With this embodiment, we showed an example of the active vibration damper 10 equipped with the electromagnetic actuator 12 of the present invention, but for example, it is also possible to use the electromagnetic actuator of the present invention as the actuator of a fluid-filled active vibration damping device such as that shown in Japanese Patent No. JP-B-4852030. Specifically, the fluid-filled active vibration damping device has a constitution such that a first mounting member and a second mounting member are elastically coupled by a main rubber elastic body, and a pressure-receiving chamber is formed a portion of whose wall is constituted by the main rubber elastic body, and non-compressible fluid or liquid is sealed in that pressure-receiving chamber. Furthermore, another portion of the wall of the pressure-receiving chamber is constituted by an oscillation member, and using the electromagnetic actuator of the present invention as the actuator that does oscillation driving of the oscillation member, the stator of the electromagnetic actuator is attached to the second mounting member, and the mover is attached to the oscillation member. Also, by the oscillation member being driven by the electromagnetic actuator, active oscillation force is applied to the pressure-receiving chamber, and it is possible to offset and reduce the input vibration.

Also, with this embodiment, an example was shown with the vehicle body 14 as the member subject to vibration damping to which the active vibration damper 10 is attached, but the member subject to vibration damping is not particularly limited.

What is claimed is:
1. An electromagnetic actuator comprising:
a stator;

a mover attached displaceable in relation to the stator;
a plurality of plate springs elastically coupling the stator and the mover; and
a coil member attached to one of the stator and the mover, the coil member being energized to generate a magnetic field that exerts a force on the mover to drive the mover in relation to the stator, wherein
each of the plate springs includes an outer circumference attachment part and a center attachment part respectively attached to one and another of the stator and the mover,
a plurality of spiral-shaped connection arm parts are provided at equal intervals in a circumferential direction between the outer circumference attachment part and the center attachment part in a radial direction so as to extend in the radial direction while being inclined in the circumferential direction,
the plate springs overlap in a thickness direction and all of the plate springs are mutually formed with a same material and in a same shape,
the plurality of plate springs are disposed on one side of the mover in a driving direction of the mover,
an outer circumference spacer is interposed between overlapping surfaces of the outer circumference attachment parts of the plate springs,
a center spacer is interposed between overlapping surfaces of the center attachment parts of the plate springs, and
the connection arm parts of the plate springs are separated from each other in the thickness direction.

2. The electromagnetic actuator according to claim 1, wherein the plate springs are matched to mutually a same position in the circumferential direction.

3. An active vibration damper comprising an actuator that is attached to a member subject to vibration damping and applies an oscillation force thereto, wherein
the actuator is composed of an electromagnetic actuator that includes: a stator; a mover attached displaceable in relation to the stator; a plurality of plate springs elastically coupling the stator and the mover; and a coil member attached to one of the stator and the mover, the coil member being energized to generate a magnetic field that exerts a force on the mover to drive the mover in relation to the stator, wherein each of the plate springs includes an outer circumference attachment part and a center attachment part respectively attached to one and another of the stator and the mover, a plurality of spiral-shaped connection arm parts are provided at equal intervals in a circumferential direction between the outer circumference attachment part and the center attachment part in a radial direction so as to extend in the radial direction while being inclined in the circumferential direction, the plate springs overlap in a thickness direction and all of the plate springs are mutually formed with a same material and in a same shape, the plurality of plate springs are disposed on one side of the mover in a driving direction of the mover, an outer circumference spacer is interposed between overlapping surfaces of the outer circumference attachment parts of the plate springs, a center spacer is interposed between overlapping surfaces of the center attachment parts of the plate springs, and the connection arm parts of the plate springs are separated from each other in the thickness direction, and
the stator of the electromagnetic actuator is attached to the member subject to vibration damping, and the mover is elastically supported on the member subject to vibration damping via the plate springs.

4. A fluid-filled active vibration damping device comprising:
a first mounting member;
a second mounting member;
a main rubber elastic body elastically coupling the first and second mounting members;
a pressure-receiving chamber a portion of whose wall is constituted by the main rubber elastic body and in which a non-compressible fluid is sealed, while another portion of the wall of the pressure-receiving chamber being constituted by an oscillation member; and
an actuator that does oscillation driving of the oscillation member, wherein
the actuator is composed of an electromagnetic actuator that includes: a stator; a mover attached displaceable in relation to the stator; a plurality of plate springs elastically coupling the stator and the mover; and a coil member attached to one of the stator and the mover, the coil member being energized to generate a magnetic field that exerts a force on the mover to drive the mover in relation to the stator, wherein each of the plate springs includes an outer circumference attachment part and a center attachment part respectively attached to one and another of the stator and the mover, a plurality of spiral-shaped connection arm parts are provided at equal intervals in a circumferential direction between the outer circumference attachment part and the center attachment part in a radial direction so as to extend in the radial direction while being inclined in the circumferential direction, the plate springs overlap in a thickness direction and all of the plate springs are mutually formed with a same material and in a same shape, the plurality of plate springs are disposed on one side of the mover in a driving direction of the mover, an outer circumference spacer is interposed between overlapping surfaces of the outer circumference attachment parts of the plate springs, a center spacer is interposed between overlapping surfaces of the center attachment parts of the plate springs, and the connection arm parts of the plate springs are separated from each other in the thickness direction, and
the stator of the electromagnetic actuator is attached to the second mounting member, and the mover is attached to the oscillation member.

* * * * *